United States Patent [19]

Glazar

[11] 4,169,187
[45] Sep. 25, 1979

[54] POWDER COATING COMPOSITION OF A MIXTURE OF EPOXY RESINS

[75] Inventor: Barbara L. Glazar, Wilmington, Del.

[73] Assignee: E. I. Du Pont de Nemours and Company, Wilmington, Del.

[21] Appl. No.: 891,146

[22] Filed: Mar. 28, 1978

Related U.S. Application Data

[63] Continuation-in-part of Ser. No. 783,729, Apr. 1, 1977, abandoned.

[51] Int. Cl.$^2$ .................... B32B 15/08; B32B 27/38
[52] U.S. Cl. ............................ 428/418; 260/37 EP; 427/27; 427/181; 427/195; 427/239; 428/35; 428/422; 428/450; 525/482
[58] Field of Search ............ 428/35, 418, 422, 450; 427/27, 28, 33, 195, 181, 239, 375; 260/837 PV, 830 TW, 824 EP, 827, 17 R, 37 EP, 42.28, 837 R

[56] References Cited

U.S. PATENT DOCUMENTS

| | | | |
|---|---|---|---|
| 2,856,094 | 10/1958 | Gloyer et al. | 428/418 X |
| 3,028,251 | 4/1962 | Nagel | 427/195 |
| 3,086,888 | 4/1963 | Stratton et al. | 260/837 PV X |
| 3,338,863 | 8/1967 | Haag | 260/37 |
| 3,474,073 | 10/1969 | Higashi | 260/830 TW |
| 3,549,581 | 12/1970 | Whang | 260/830 TW X |
| 3,560,388 | 2/1971 | Higashi | 260/830 TW X |
| 3,648,960 | 2/1972 | Haag | 260/28 |
| 3,666,695 | 5/1972 | Jachimowicz et al. | 260/830 TW X |
| 3,784,506 | 1/1974 | Vasta | 260/39 R |
| 3,868,613 | 2/1975 | Rogers | 428/418 X |
| 3,882,064 | 5/1975 | Pregmon | 260/28 |
| 3,936,557 | 2/1976 | Watt | 260/830 TW X |
| 3,993,841 | 11/1976 | Matsubara et al. | 428/418 |
| 4,009,223 | 2/1977 | Noonan | 260/830 TW |
| 4,040,993 | 8/1977 | Elbling et al. | 260/830 TW |
| 4,075,260 | 2/1978 | Tsen et al. | 260/830 TW |
| 4,077,927 | 3/1978 | McPherson | 428/418 X |

*Primary Examiner*—Shrive P. Beck

[57] ABSTRACT

A powder coating composition of a mixture of epoxy resins is obtained by blending two types of epoxy resins with a curing agent. One resin is of the epichlorohydrin-bisphenol-A type. The other resin is an epichlorohydrin-bisphenol-A epoxy modified with an epoxy-novolac. Cure is obtained by using a dicyandiamide crosslinking agent. The composition is useful as a coating for the interior of food and beverage containers. The composition is also useful as a lining in hot-water services when finely divided polyvinylidine fluoride powder is added for hydrophobicity.

19 Claims, No Drawings

POWDER COATING COMPOSITION OF A MIXTURE OF EPOXY RESINS

CROSS REFERENCE TO RELATED APPLICATIONS

This application is a continuation-in-part of co-pending application Ser. No. 783,729 filed Apr. 1, 1977 now abandoned.

BACKGROUND OF THE INVENTION

1. Field of the Invention

This invention is related to thermosetting powder coating compositions and in particular to compositions containing epoxy resins.

2. Description of the Prior Art

Epoxy resin powder coating compositions are well known, as shown by U.S. Pat. No. 3,028,251 issued Apr. 3, 1962 to Nagel; U.S. Pat. Nos. 3,338,863 and 3,645,960 issued Aug. 29, 1967 and Feb. 29, 1972, respectively, to Haag. However, these powder coating compositions do not meet the approval of the Food and Drug Administration (FDA) for food contact use, such as for protective coatings for food and beverage containers. Epoxy powder compositions of Pregmon U.S. Pat. No. 3,882,064 issued May 6, 1975 have FDA approval for food contact use but are not adequate for use in steel containers for highly acidic foods such as tomato products or juices.

Therefore, there remains a need for a powder coating composition which is approved for food contact and which is adequate for use with acidic foods.

SUMMARY OF THE INVENTION

The thermosetting powder coating composition of this invention consists essentially of finely divided particles at least 90 percent by weight of which have a maximum dimension not exceeding 100 microns. The particles are a blend of a composition of:

(A) 12.50–72.95% by weight of an epoxy resin of the formula

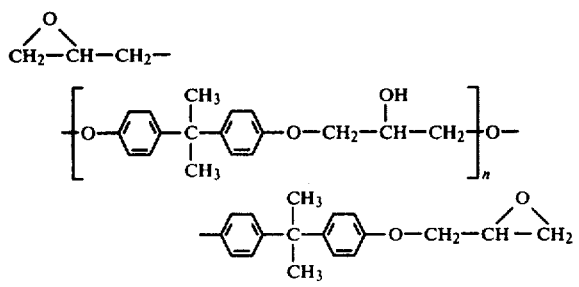

where n is sufficiently large to provide a resin with a Gardner Holdt Viscosity of L-U measured at 40% polymer solids in diethylene glycol n-butyl ether at 25° C. and having an epoxide equivalent weight of 600–1000;

(B) 20–50% by weight of an epoxy/epoxy novolac resin which is an epoxy resin of the formula of (A) modified with an epoxy novolac resin of the formula

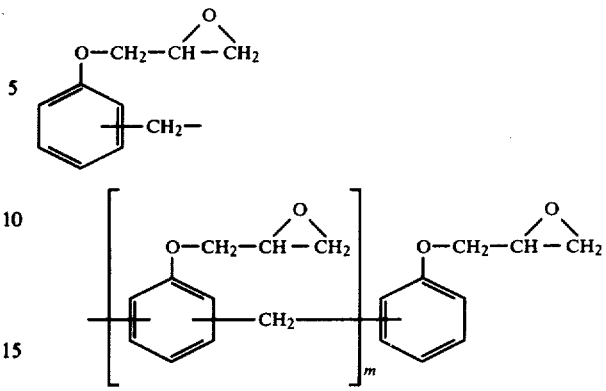

where n of the epoxy resin and m of the epoxy novolac resin have values sufficiently large to provide an epoxy/epoxy novolac resin having a Gardner Holdt Viscosity of L-U measured as in (A) and having an epoxide equivalent weight of 400–900;

(C) 5–30% by weight of a second epoxy/epoxy novolac resin of the formula of (B) but having values for n and m sufficiently large to provide an epoxy/epoxy novolac resin with a Gardner Holdt Viscosity of V-$Z_1$ measured as in (A) and having an epoxide equivalent weight of 600–1000;

(D) 0.05–0.5% by weight of a catalyst of tri(dimethyl aminomethyl) phenol or a fatty acid salt thereof; and (E) 2.0–7.0% by weight of dicyandiamide.

Optionally, the composition can contain 45–86% by weight, based on the weight of (A) plus (B) plus (C), of polyvinylidine fluoride in the form of finely divided particles at least 80% by number of which have a maximum dimension not exceeding 5 microns.

DETAILED DESCRIPTION OF THE INVENTION

The coating composition of this invention has a powder particle size such that at least 90 percent by weight of the particles have a maximum dimension not exceeding 100 microns. Preferably, the particles of binder component, designated herein to be the epoxy and epoxy/epoxy novolac resin, are 10–74 microns in maximum dimension and more preferably 20–55 microns.

About 12.5–72.9% by weight of the powder coating composition is an epoxy resin of the epichlorohydrinbisphenol-A type of the formula

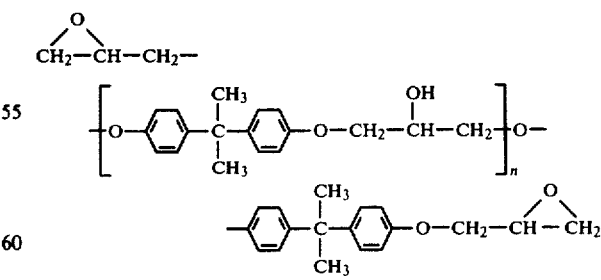

where n is sufficiently large to provide a resin with a Gardner Holdt Viscosity of L-U and having an epoxide equivalent weight of 600–1000. As used in this specification, Gardner Holdt Viscosity is based on measurements taken at 40% polymer solids in diethylene glycol n-butyl ether at 25° C. The epoxide equivalent weight is the weight in grams of resin that contains one gram equivalent of epoxide.

In one preferred resin which forms a high-quality coating in combination with the other constituents of the present invention, the Gardner Holdt Viscosity is N-R and the epoxide equivalent weight is 700–800.

About 20–50% by weight of an epoxy/epoxy novolac resin is used in the composition. Such a resin is an epichlorohydrin-bisphenol-A resin of the formula shown above modified with an epoxy novolac resin of the formula

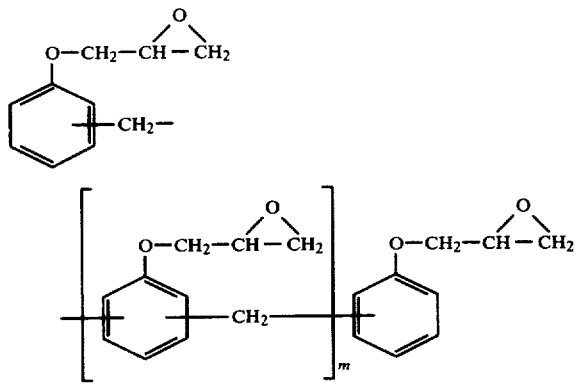

where n of the epoxy resin and m of the epoxy novolac resin have values sufficiently large to provide an epoxy/epoxy novolac resin having a Gardner Holdt Viscosity of L-U and an epoxide equivalent weight of 400–900.

Epoxy/epoxy novolac resins are formed by modifying an epichlorohydrin-bisphenol-A resin with an epoxy novolac resin of the type shown in U.S. Pat. No. 2,685,885. It is believed that the modification is either direct crosslinking of the two resins or indirect crosslinking through reaction of both resins with bisphenol-A.

By varying the ratio of epichlorohydrin-bisphenol-A epoxy to epoxy novolac, the viscosity and epoxide equivalent weight can be varied and epoxy/epoxy novolac resins of different reactivity can be provided.

About 5–30% by weight of a second epoxy/epoxy novolac resin is used in the composition. This resin has the same general formula as the above epoxy/epoxy novolac but has a Gardner Holdt Viscosity of V-$Z_1$ and an epoxide equivalent weight of 600–1000.

A curing catalyst in the amount of 0.05–0.50% by weight is used in the composition. Preferably, about 0.01–0.4% by weight of the catalyst is used. The catalyst is tri(dimethyl aminomethyl)phenol or its fatty acid salts. Typical fatty acid salts that can be used are tri(-dimethyl aminomethyl)phenol caprate, tri(dimethyl aminomethyl) caprylate, tri(dimethyl aminomethyl)-phenol isodecanoate, tri(dimethyl aminomethyl)phenol linoleate, tri(dimethyl aminomethyl)phenol naphthenate, tri(dimethyl aminomethyl) phenol neodecanoate, tri(dimethyl aminomethyl)phenol octoate, tri(dimethyl aminomethyl)phenol 2-ethyl hexoate, tri(dimethyl aminomethyl)phenol oleate, tri(dimethyl aminomethyl)phenol palmitate, tri(dimethyl aminomethyl)-phenol resinate, tri(dimethyl aminomethyl)phenol resinoleate, tri(dimethyl aminomethyl)phenol soyate, tri(-dimethyl aminomethyl)phenol stearate, tri(dimethyl aminomethyl)phenol tallate and the like.

One preferred catalyst which forms a high quality product is 2,4,6-tri(dimethyl aminomethyl)phenol.

The composition contains 2.0–7.0% by weight of dicyandiamide curing agent. To improve the handling characteristics of the dicyandiamide, the compound can be blended with finely divided silica. For example, a blend in a ratio of 95/5 of dicyandiamide to silica can be used.

Flow control agents can be added to the powder coating composition of this invention in amounts of about 0.01–1.0% by weight. Typical flow control agents are polyacrylates, such as poly-2-ethylhexyl acrylate, finely divided ethyl cellulose, and siloxanes, such as dimethyl polysiloxanes or methyl phenyl polysiloxane.

To improve the handling properties of the powder coating composition and to prevent caking, finely divided silica in the amounts of 0.05–0.5% by weight can be added. The silica can be blended with any of the epoxy resins or as mentioned before with the dicyandiamide. The silica is preferably fumed silica. This is a very fine, amorphous silica formed from silica spheres having an average diameter of 7–14 milimicrons. A suitable substance for this purpose is commercially available under the trademark Cab-O-Sil ® registered to Cabot Corporation.

One particularly preferred composition that forms a high quality interior coating for steel containers is of (A) 33.6–55.9% by weight of an epoxy resin having the aforementioned formula wherein the resin has a Gardner Holdt Viscosity of N-R and an epoxide equivalent weight of 700–800;

(B) 35–45% by weight of an epoxy/epoxy novolac resin described previously where n and m are sufficiently large to provide a Gardner Holdt Viscosity of O-S and an epoxide equivalent weight of 500–700;

(C) 5–15% by weight of a second epoxy/epoxy novolac resin described previously where n and m are sufficiently large to provide a Gardner Holdt Viscosity of W-Z and an epoxide equivalent weight of 700–900;

(D) 0.1–0.4% by weight of a catalyst of tri(dimethyl aminomethyl) phenol; and (E) 4.0–6.0% by weight of dicyandiamide.

Another useful composition that forms a high quality finish on the interior of steel containers is of (A) 28.6–60.9% by weight of the epoxy resin described in the above preferred composition;

(B) 20.0–30.0% by weight of the epoxy/epoxy novolac resin described in the above preferred composition, (C) 15.0–35.0% by weight of a second epoxy/epoxy novolac resin described in the above preferred composition;

(D) 0.1–0.4% by weight of a catalyst of tri(dimethyl aminomethyl) phenol and (E) 4.0–6.0% by weight of dicyandiamide.

The composition can be pigmented or unpigmented but is usually pigmented and contains pigments in a pigment/binder ratio of 2/100 to 80/100. Any of the conventional inorganic or organic pigments, filler pigments, or dyes can be used. Examples of the great variety of usable pigments are as follows: metallic oxides, such as titanium dioxide, zinc oxide, iron oxide and the like; metallic flakes such as aluminum flake; metallic powders; metal hydroxides, "Afflair" pigments such as mica flake coated with titanium dioxide; sulfides; sulfates; carbonates; carbon black; silica; talc; china clay; and other extender pigments.

However, if the powder coating composition is to be in contact with foods only those pigments and additions having Food and Drug Administration approval are used.

One method for forming the powder coating composition of this invention is to blend the components together and then to pass the mixture through a conventional extruder.

The extrudate can then be reduced to a powder using conventional grinding equipment. After grinding, the powder is passed through a sieve to remove particle larger than 110 microns. Preferably, a seive which eliminates particles of maximum dimension greater than 74 microns is used.

In another aspect of the present invention, it has been found that the composition has excellent hydrophobicity, such that it is very useful as a lining for hot water tanks, when about 45-86% by weight, based on the weight of the binder components, of polyvinylidine fluoride is added. The polyvinylidine fluoride can be of the type described in U.S. Pat. No. 2,435,537. Although most useful for coating the interiors of water heater tanks, this composition is also useful to line boilers, pipe and drum interiors, industrial containers, or any surface which contacts water at elevated temperatures.

Preferably, the polyvinylidine fluoride is in particulate form. The particles can have a maximum dimension up to 12-15 microns with 80% by number, but most preferably 95% by number, having a maximum dimension of 5 microns or less. A suitable substance to use is Kynar ®, sold by Pennwalt Chemical Company.

Polyvinylidine fluoride is ordinarily present in this composition in an amount equal to 45-86%, preferably 50-75% and most preferably 57-65%, of the weight of the binder. A preferred composition which forms a high quality lining for the interior of a hot water tank is of (A) 25.0-35.0% by weight of an epichlorohydrinbisphenol-A epoxy resin of the aforementioned formula wherein the resin has a Gardner Holdt Viscosity of N-R and an epoxide equivalent weight of 700-800;

(B) 20.0-30.0% by weight of an epoxy/epoxy novolac resin as described previously where n and m are sufficiently large to provide a Gardner Holdt Viscosity of O-S and an epoxide equivalent weight of 500-700;

(C) 4.0-8.5% by weight of a second epoxy/epoxy novolac resin described previously where n and m are sufficiently large to provide a Gardner Holdt Viscosity of W-Z and an epoxide equivalent weight of 700-900;

(D) 0.06-0.12% by weight of a catalyst of tri(-dimethyl aminomethyl) phenol;

(E) 1.5-3.5% by weight of dicyandiamide; and (F) 33.0-41.5% by weight of polyvinylidine fluoride.

The powder coating composition containing polyvinylidine fluoride can be formed in much the same way as previously described. However, it has been found that when the powder composition is to contain more than 20% by weight of the fluoropolymer, the powder composition can be more easily formed when the excess over 20% is post-added by dry blending. That is, in such a situation, the composition which is extruded contains no more than 20% by weight, based on total composition weight, of polyvinylidine fluoride. After the extrudate is reduced to powder form, as previously described, an amount of particulate polyvinylidine fluoride which is sufficient to raise the concentration to the desired level is added to, and thoroughly mixed with, the powder.

The powder coating compositions of this invention can be applied to a metal, glass, plastic, or a fiber-reinforced plastic substrate by electrostatic spraying or by using a fluidized bed which can be electrostatic. Preferably, electrostatic spraying is used in which a voltage of 20-100 kilowatts is applied to the spray gun. The composition can be applied in one pass or several passes to provide variable thicknesses, after cure, of 1.5-4.0 mils, preferably 1.8-3.0 mils. After the application of the powder, the coated article is heated at 180°-235° C. for 6-15 minutes to fuse and to cure the powder particles into a substantially continuous uniform coating.

Since the binder components of the present invention are more fluid than the polyvinylidine fluoride at the extrusion and cure temperatures, the cured coating substantially approximates a continuous phase of crosslinked epoxy and epoxy/epoxy novolac resins having polyvinylidine fluoride dispersed throughout.

The powder coating composition can be applied directly to untreated metals such as aluminum or steel. In one particular application, the powder is applied directly to the exterior or to the interior of steel containers which are used for aqueous acidic foods and beverages, such as tomato products like pastes, soups, juices, and catsup.

The coating composition can also be applied over a suitably treated or primed metal substrate. Typical conventional alkyd primers or epoxy primers pigmented with iron oxide, carbon black, titanium dioxide and the like can be used. Electrodeposited primers can also be used. Also, the composition can be used directly over galvanized phosphatized steel to form a durable coating. An electrically conductive carbon black pigment can be added to the primer to make the surface conductive and to promote uniform deposition of the powder while spraying.

The following Examples illustrate the invention. All quantities are on a weight basis unless otherwise indicated.

EXAMPLE I

The following ingredients are mixed together to form powder coating composition A.

| | | Parts by Weight |
|---|---|---|
| 1. | Epichlorohydrin-Bisphenol-A type epoxy resin having the formula described and shown in the above specification wherein n is sufficiently large to provide a resin with a Gardner Holdt Viscosity of P and an epoxide equivalent weight of 765. | 42.5 |
| 2. | Epoxy/Epoxy Novolac type resin having the formula described and shown in the above specification wherein n and m are sufficiently large to provide a resin with a Gardner Holdt Viscosity of O-S and an epoxide equivalent weight of 500-575. | 40.0 |
| 3. | Epoxy/Epoxy Novolac II resin having the formula described and shown in the above specification wherein n and m are sufficiently | |

|   |   | Parts by Weight |
|---|---|---|
|   | large to provide a Gardner Holdt Viscosity of W-Z and an epoxide equivalent weight of 775–850. | 10.0 |
| 4. | Flow agent (5% by weight polyethylhexyl acrylate and 95% by weight of the epoxy resin described as ingredient 1.) | 7.5 |
| 5. | Curing agent (95/5 weight ratio of dicyandiamide to finely divided silica) | 4.0 |
| 6. | Catalyst [2,4,6-tri(dimethyl aminomethyl)phenol] | 0.15 |
| 7. | Titanium dioxide pigment | 50.0 |
|   | Total | 154.15 |

The above mixture is charged into a standard three zone melt extruder in which zone 1 is at 50° C., zone 2 is at 70° C. and zone 3 is at 100° C. and which is operated at 90 revolutions per minute. The resulting molten mixture is extruded and the resulting extrudate is cut into pellets and charged into a grinding mill that grinds the extrudate into a powder. The resulting powder is passed through a 140 mesh screen to remove large particles.

The powder is sprayed onto the exterior of phosphatized cold roll steel panels with an electrostatic powder gun and the panels are baked for 6 minutes at 205° C. in a gas oven. The resulting finish on the panels is about 1.5–2.0 mils thick and is smooth, even, glossy, flexible and has a good appearance. The finish has a gloss measured at 60° of 96.3 and a Tukon hardness of 19.2.

Three of the above prepared panels are immersed about half way into boiling water for one hour and then removed and examined for staining, delamination, pinholes and other defects in the finish. No defects in the finish on any of the exposed portions of the panels were found. After six hours in boiling water the panels were examined and no defects were found.

Adhesion of the finish is tested by scoring the finish through to the metal and attempting to remove finish from the panel with scotch tape. The width of coating, measured from the center of the score line, which delaminates is known as creepage. The creepage of the finish is minimal and therefore its adhesion to the metal is acceptable.

Three of the above finished panels are immersed in tomato paste at 60° C. for 2 weeks, tomato paste at 49° C. for 1 month and tomato paste at 38° C. for 6 months, respectively. After each of the above time periods, the panel was removed and examined for defects, such as loss of adhesion, delaminating and staining. In each case the finish was found to be acceptable.

Powder coating composition B is prepared identically to the above coating composition except 25 parts by weight of the Epoxy/Epoxy Novolac resin and 25 parts of the Epoxy/Epoxy Novolac II resin are used. The resulting powder coating composition is applied as above to phosphatized steel substrates and baked as above. The resulting finish is about 1.5–2.0 mils thick and is smooth, even, glossy and has a good appearance. The finish has a Tukon hardness of greater than 16 knoops.

The panels are tested in boiling water and in tomato paste as above and similar results were noted. None of the finishes on the panels failed the tests but were acceptable.

EXAMPLE 2

Powder coating composition C is prepared using the same procedure and constituents used to prepare powder coating composition A of Example 1 except the following Resin is substituted for the Epoxy/Epoxy Novolac resin (ingredient 2):

Epoxy/Epoxy Novolac resin wherein n and m are sufficiently large to provide a Gardner Holdt Viscosity of R to T and an epoxide equivalent weight of 700–825.

The resulting powder coating composition is applied as in Example 1 to phosphatized steel substrates and baked as above. The resulting finish is about 1.5–2.0 mils thick, is smooth, and glossy, even and flexible and has a good appearance.

About half of a panel is immersed in boiling water and in tomato paste as in Example 1. No defects in the finish such as stains, cracks, and pinholes are noted.

EXAMPLE 3

The following ingredients are mixed together to form powder coating composition D.

|   |   | Parts by Weight |
|---|---|---|
| 1. | The epoxy resin described as ingredient 1 in Example 1 | 22.06 |
| 2. | The epoxy/epoxy novolac resin described as ingredient 2 in Example 1. | 20.76 |
| 3. | The epoxy/epoxy novolac II resin described as ingredient 3 in Example 1 | 5.19 |
| 4. | Flow agent (described in Example 1) | 3.89 |
| 5. | Curing agent (described in Example 1) | 2.08 |
| 6. | Catalyst [2,4,6-Tri(dimethyl aminomethyl) phenol] | 0.08 |
| 7. | Titanium dioxide pigment | 25.87 |
| 8. | Aluminum/Cobalt Oxide Pigment | 0.56 |
| 9. | Kynar ® | 20.0 |
|   | Total | 100.49 |

The above mixture is charged into a standard three-zone melt extruder in which zone 1 is at 55° C., zone 2 is at 80° C., and zone 3 is at 100°–110° C. and which is operated at 90 revolutions per minute. The resulting molten mixture is extruded and the resulting extrudate is broken into chips and then charged into a grinding mill where it is ground to a fine powder. The powder is then passed through a 140 mesh screen.

This powder is then thoroughly mixed with Kynar ® powder in a concentration of 90 parts by weight of powder to 10 parts Kynar ®. The resulting powder composition is then sieved again through a 140 mesh screen.

The powder is sprayed onto the exterior of phosphatized cold roll steel panels with an electrostatic powder gun. The panels are heated in a gas oven for 6 minutes at 205° C. The resulting finish on the panels is about 2.4–2.6 mils thick and is smooth and even with no popping or cratering.

Several of the above-prepared panels are immersed in a resin kettle of refluxing boiling water for two months. At the end of this period, the panels are tested for adhesion, impact resistance, and extent of blistering.

Adhesion of the finish is tested as in Example 1. The creepage is found to be approximately 0.8 mm which is acceptable. The impact resistance is tested with a Gardner impact tester No. 16-1120 and the coated panel is found to have a reverse impact resistance of 100 inch-pounds. A visual inspection is made for blistering and only slight blistering along the panel edge, within acceptable limits, is noted.

What is claimed is:

1. A thermosetting powder coating composition comprising finely divided particles at least 90 percent by weight of which have a maximum dimension not exceeding 100 microns wherein the particles consist essentially of (A) 12.50-72.95% by weight of an epoxy resin of the formula

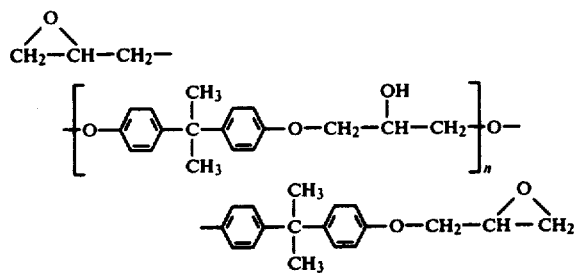

where n is sufficiently large to provide a resin with a Gardner Holdt Viscosity of L-U and having an epoxide equivalent weight of 600-1000;

(B) 20-50% by weight of a first epoxy/epoxy novolac resin which is a epoxy resin of the formula of (A) modified with an epoxy novolac resin of the formula

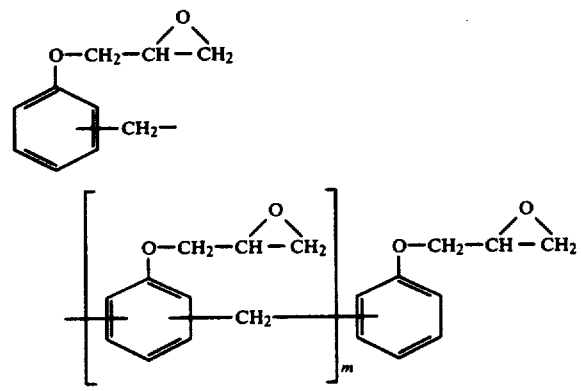

where n of the epoxy resin and m of the epoxy novolac resin are sufficiently large to provide an epoxy/epoxy novolac resin having a Gardner Holdt Viscosity of L-U and an epoxide equivalent weight of 400-900;

(C) 5-30% by weight of a second epoxy/epoxy novolac resin of the formula of (B) but having values for n and m sufficiently large to provide an epoxy/epoxy novolac resin with a Gardner Holdt Viscosity of V-Z₁ and having an epoxide equivalent weight of 600-1000;

(D) 0.05%-0.5% by weight of a catalyst of tri(-dimethyl aminomethyl) phenol or fatty-acid salts thereof; and (E) 2.0-7.0% by weight of dicyanadiamide.

2. The powder coating composition of claim 1 additionally containing pigment in a pigment to binder ratio of 2/100 to 80/100.

3. The powder coating composition of claim 1 wherein the particles consist essentially of (A) 33.6-55.9% by weight of said epoxy resin;
(B) 35.0-45.0% by weight of said first epoxy/epoxy novolac resin;
(C) 5.0-15.0% by weight of said second epoxy/epoxy novolac resin;
(D) 0.1-0.4% by weight of said catalyst, and
(E) 4.0-6.0% by weight of dicyandiamide.

4. The powder coating composition of claim 1 wherein the particles consist essentially of (A) 28.6-60.9% by weight of said epoxy resin,
(B) 20.0-30.0% by weight of said first epoxy/epoxy novolac resin;
(C) 15.0-35.0% by weight of said second epoxy/epoxy novolac resin.
(D) 0.1-0.4% by weight of said catalyst; and
(E) 4.0-6.0% by weight of dicyandiamide.

5. The coating composition of claim 1 wherein said epoxy resin has a Gardner Holdt Viscosity of N-R and has an epoxide equivalent weight of 700-800.

6. The powder coating composition of claim 5 additionally containing 0.1-1.0% by weight of a flow-control agent of ethyl cellulose, a polyacrylate, or a siloxane.

7. The powder coating composition of claim 6 in which the flow control agent is a polyacrylate.

8. The powder coating composition of claim 6 additionally containing 0.05-0.5% by weight of finely divided silica.

9. A metal substrate coated with a smooth, even, coalesced layer of the powder coating composition of claim 1.

10. The coated metal substrate of claim 9 in which the metal is steel.

11. A thermosetting powder coating composition comprising fine divided particles at least 90 percent by weight of which have a maximum dimension not exceeding 100 microns wherein the particles consist essentially of (A) 15.5-46.5% by weight of an epoxy resin of the formula

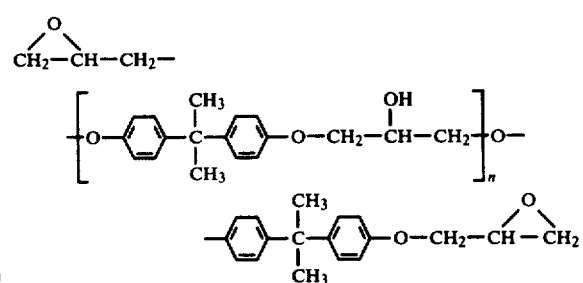

where n is sufficiently large to provide a resin with a Gardner Holdt Viscosity of L-U and having an epoxide equivalent weight of 600-1000;

(B) 14.0-34.5% by weight of a first epoxy/epoxy novolac resin which is an epoxy resin of the formula of (A) modified with an epoxy novolac resin of the formula

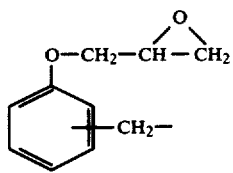

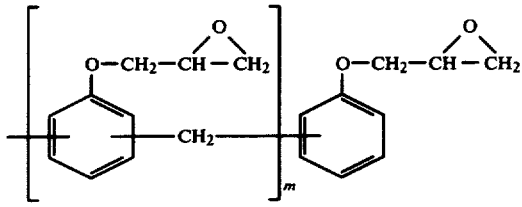

where n of the epoxy resin and m of the epoxy novolac resin are sufficiently large to provide an epoxy/epoxy novolac resin having a Gardner Holdt Viscosity of L-U and an epoxide equivalent weight of 400–900;

(C) 3.0–19.0% by weight of a second epoxy/epoxy novolac resin of the formula of (B) but having values for n and m sufficiently large to provide an epoxy/epoxy novolac resin having a Gardner Holdt Viscosity of V-$Z_1$ and having an epoxide equivalent weight of 600–1000;

(D) 0.04–0.4% by weight of a catalyst of tri(dimethyl aminomethyl) phenol or a fatty-acid salt thereof;

(E) 1.5–5.0% by weight of dicyandiamide; and (F) 29.0–45.0% by weight of polyvinylidine fluoride.

12. The powder coating composition of claim 11 additionally containing pigment in a pigment to binder ratio of 2/100–80/100.

13. The powder coating composition of claim 11 wherein the particles consist essentially of
(A) 25.0–35.0% by weight of said epoxy resin;
(B) 20.0–30.0% by weight of said first epoxy/epoxy novolac resin;
(C) 4.0–8.5% by weight of said second epoxy/epoxy novolac resin;
(D) 0.06–0.12% by weight of said catalyst;
(E) 1.5–3.5% by weight of dicyandiamide; and
(F) 33.0–41.5% by weight of polyvinylidine fluoride.

14. The powder coating composition of claim 11 wherein said epoxy resin has a Gardner Holdt Viscosity of N-R and has an epoxide equivalent weight of 700–800.

15. The powder coating composition of claim 14 additionally containing 0.1–1.0% by weight of a flow control agent of ethyl cellulose, a polyacrylate, or a siloxane.

16. The powder coating composition of claim 15 wherein the flow control agent is a polyacrylate.

17. The powder coating composition of claim 15 containing 0.05–0.5% by weight of finely divided silica.

18. A metal substrate coated with a smooth, even, coalesced layer of the powder coating composition of claim 11.

19. The coated metal substrate of claim 18 in which the metal is steel.

* * * * *